(12) United States Patent
Yang et al.

(10) Patent No.: US 9,951,755 B2
(45) Date of Patent: Apr. 24, 2018

(54) BRAKE AND PROCESSING DEVICE USING THE SAME FOR A CUTTER DEVICE IN PROCESSING APPARATUS

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Ming-Lu Yang, New Taipei (TW); Yang-Mao Peng, Jiashan (CN); Jian-Shi Jia, Jiashan (CN); Jing-Shuang Sui, Jiashan (CN); Zhen-Guang Xu, Jiashan (CN); Jie Li, Jiashan (CN); Da-Qing Zhuang, Jiashan (CN); Zhen-Lin Zhao, Jiashan (CN); Jun Fu, Jiashan (CN)

(73) Assignees: FU DING ELECTRONICAL TECHNOLOGY (JIASHAN), Jiashan (CN); HON HAI PRECISION INDUSTRY CO., LTD., New Taipei (TW)

( * ) Notice: Subject to any disclaimer, the term of this patent is extended or adjusted under 35 U.S.C. 154(b) by 175 days.

(21) Appl. No.: 14/920,546

(22) Filed: Oct. 22, 2015

(65) Prior Publication Data

US 2016/0114446 A1    Apr. 28, 2016

(30) Foreign Application Priority Data

Oct. 24, 2014  (CN) .......................... 2014 1 0573830

(51) Int. Cl.
*B23Q 15/22*     (2006.01)
*F03G 1/10*      (2006.01)
(Continued)

(52) U.S. Cl.
CPC ................. *F03G 1/10* (2013.01); *B23Q 1/58* (2013.01); *B23Q 11/04* (2013.01); *B23Q 5/58* (2013.01);
(Continued)

(58) Field of Classification Search
CPC ......... B23B 29/18; B23B 29/04; B23B 29/12; B23B 2260/136; B23Q 15/00;
(Continued)

(56) References Cited

U.S. PATENT DOCUMENTS 1,852,736 A * 4/1932 Connell ............... B25H 1/0021
                                                                144/135.4
3,708,238 A * 1/1973 Kissane ............... B25H 1/0078
                                                                408/112
(Continued)

FOREIGN PATENT DOCUMENTS

CN        201033403 Y    3/2008
CN        201779090 U    3/2011
(Continued)

*Primary Examiner* — Nicole N Ramos
(74) *Attorney, Agent, or Firm* — ScienBiziP, P.C.

(57) ABSTRACT

A processing device includes a mounting base, a cutter holder, and a brake. The brake includes a driving member, a resisting member, and an elastic member. The driving member includes a main body and a driving shaft movably placed in the main body. The driving shaft is driven to move in a straight line by the main body. One end of the driving shaft is movably coupled to the cutter holder, and another end of the driving shaft is coupled to the resisting member. The elastic member is positioned between the main body and the resisting member. The driving shaft is configured to move toward one side of the driving member adjacent to the elastic member under an elastic restoring force of the elastic (Continued)

member, whereby the cutter holder moves with the driving shaft toward one end of the driving member adjacent to the elastic member.

7 Claims, 3 Drawing Sheets

(51) Int. Cl.
  *B23Q 1/58* (2006.01)
  *B23Q 11/04* (2006.01)
  *B23Q 16/00* (2006.01)
  *B23Q 5/58* (2006.01)
(52) U.S. Cl.
  CPC ............ *B23Q 15/22* (2013.01); *B23Q 16/003* (2013.01); *Y10T 82/2541* (2015.01); *Y10T 82/2577* (2015.01); *Y10T 408/5653* (2015.01)
(58) Field of Classification Search
  CPC ...... B23Q 15/22; B23Q 15/225; B23Q 15/24; B23Q 16/003; B23Q 11/04; B23Q 5/22; B23Q 5/34; B23Q 5/58; Y10T 408/18; Y10T 408/20; Y10T 408/5653; Y10T 408/675; Y10T 408/6757; Y10T 408/6764; Y10T 408/6771; Y10T 408/6774; Y10T 408/6776; Y10T 408/6779; Y10T 408/6786; Y10T 408/6793; Y10T 408/92; Y10T 82/2531; Y10T 82/2541; Y10T 82/2533; Y10T 82/2572; Y10T 82/2574; Y10T 82/2577
  See application file for complete search history.

(56) References Cited

U.S. PATENT DOCUMENTS

| | | | | | |
|---|---|---|---|---|---|
| 4,329,095 | A | * | 5/1982 | Schmuck | B23B 49/006 408/112 |
| 4,473,971 | A | | 10/1984 | Mischler et al. | |
| 4,923,341 | A | * | 5/1990 | Cameron | B25F 3/00 408/112 |
| 4,995,300 | A | * | 2/1991 | Kaplan | B23Q 35/102 82/12 |
| 5,022,294 | A | * | 6/1991 | Higuchi | G05B 19/184 267/161 |
| 5,025,548 | A | * | 6/1991 | Justesen | B23Q 5/045 29/560 |
| 5,054,340 | A | * | 10/1991 | Sugita | B23Q 1/601 82/118 |
| 5,961,257 | A | * | 10/1999 | Bettini | E01B 31/24 279/82 |
| 6,860,682 | B1 | * | 3/2005 | Le Picq | B25H 1/0078 408/112 |
| 7,357,054 | B2 | * | 4/2008 | Schneider | B23Q 5/027 82/157 |

FOREIGN PATENT DOCUMENTS

| | | | | |
|---|---|---|---|---|
| DE | 743795 C | * | 3/1952 | ............ B23B 29/18 |
| DE | 2116142 A1 | * | 10/1972 | ............ B23B 29/18 |
| DE | 2812296 A1 | * | 10/1979 | ........... B25H 1/0042 |
| DE | 3113496 A1 | * | 10/1982 | ........ B23Q 11/0053 |
| JP | 58056717 A | * | 4/1983 | ........... B25H 1/0042 |
| JP | 09309014 A | * | 12/1997 | |
| TW | 201119791 A1 | | 6/2011 | |

* cited by examiner

BRAKE AND PROCESSING DEVICE USING THE SAME FOR A CUTTER DEVICE IN PROCESSING APPARATUS

FIELD

The subject matter herein generally relates to a brake and a processing device using the same in a processing apparatus.

BACKGROUND

In manufacturing process, a cutter is used to process a workpiece driven by a driving member. The cutter can be driven by a linear motor. However, if the linear motor loses power suddenly, the cutter would keep moving due to the inertia effect and bring about the workpiece being damaged.

BRIEF DESCRIPTION OF THE DRAWINGS

Implementations of the present technology will now be described, by way of example only, with reference to the attached figures.

DETAILED DESCRIPTION

Figure 1:
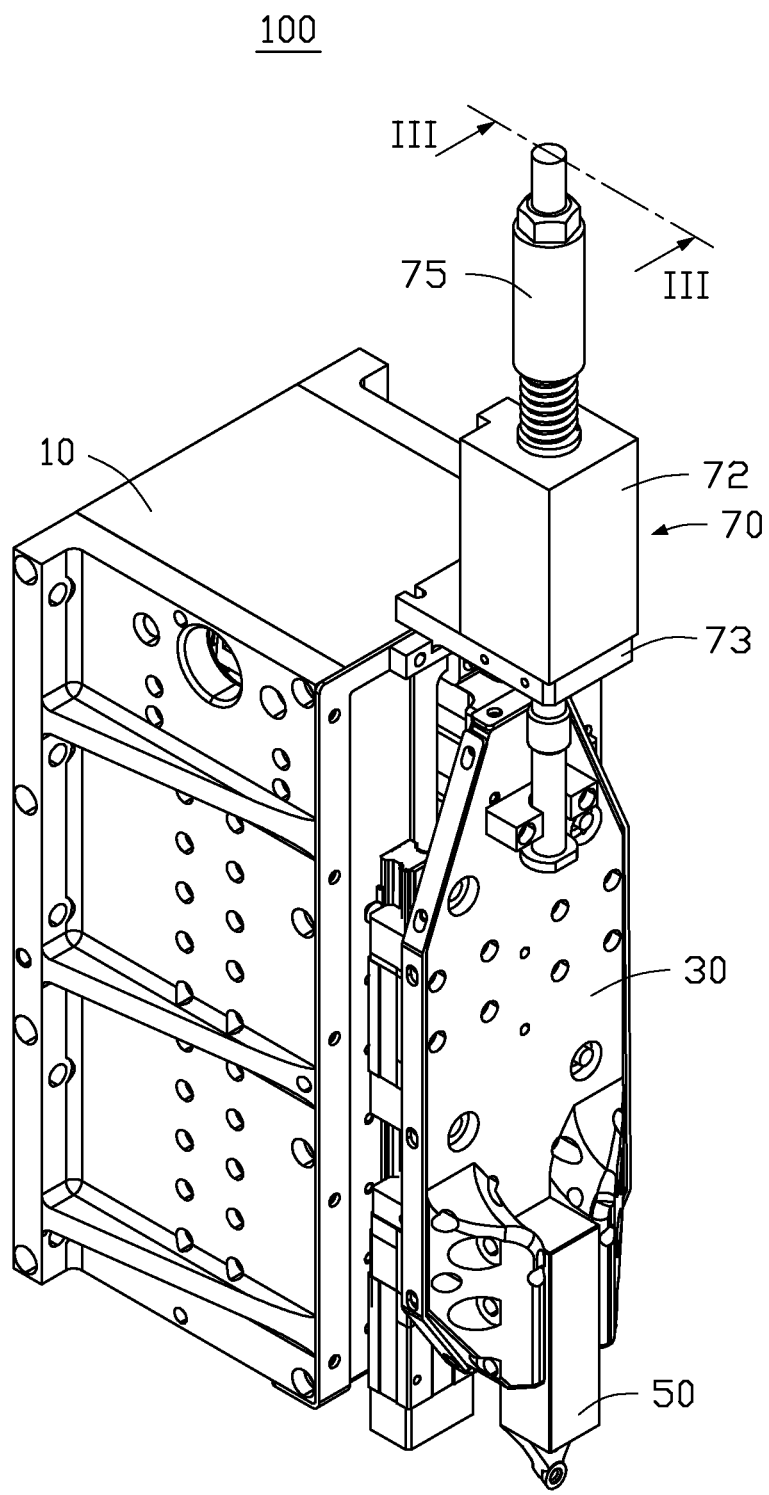
FIG. 1 is an isometric view of one embodiment of a processing device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as coupled, whether directly or indirectly through intervening components, and is not necessarily limited to physical connections. The connection can be such that the objects are permanently coupled or releasably coupled. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

The present disclosure is described in relation to a brake and a processing device using the same. The processing device can be configured to drive a cutter to move relative to a workpiece, such that the workpiece can be processed.

FIG. 1 illustrates that a processing device 100 can include a mounting base 10, a cutter holder 30 slidably mounted on the mounting base 10, a cutter 50 mounted on the cutter holder 30, and a brake 70 mounted on the mounting base 10 and the cutter holder 30. The brake 70 is configured to retract the cutter holder 30 when the processing device 100 losing power. The processing device 100 can further include other components, such as a linear motor (not shown) used to drive the cutter holder 30. The brake 70 can include a driving member 72, a fixing base 73, and a resisting member 75.

Figure 2:
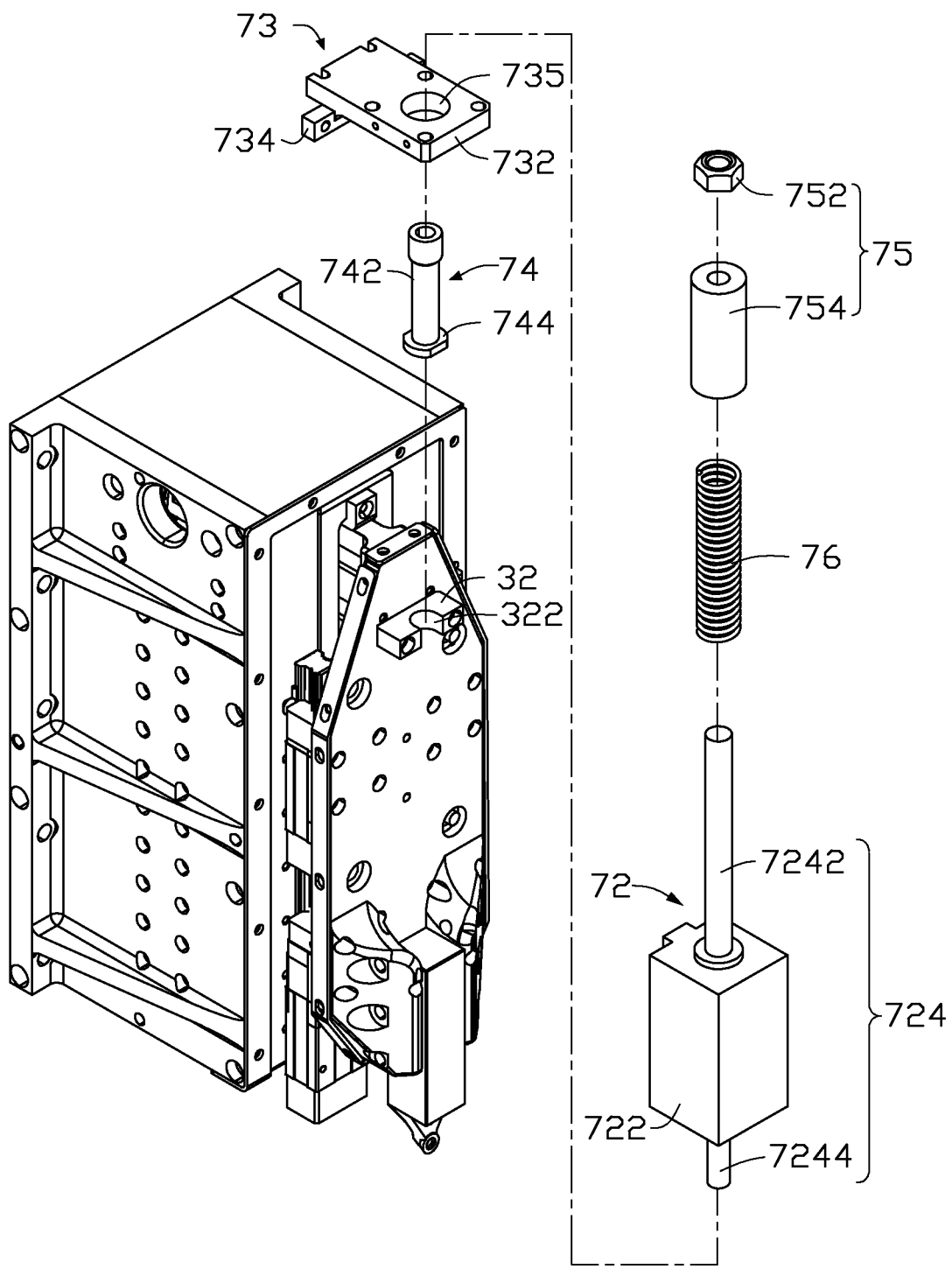
FIG. 2 is an exploded, isometric view of the processing shown in FIG. 1.

FIG. 2 illustrates that the brake 70 can further include an elastic member 76. The resisting member 75 can be fixed at one end of the driving member 72, and the elastic member 76 can be positioned between the resisting member 75 and the driving member 72. The driving member 72 can include a main body 722 and a driving shaft 724. The main body 722 can be used to drive the driving shaft to move in a straight line, and the driving shaft 724 can be movably coupled to the main body 722 and movably placed in the main body 722. The main body 722 can have two ends, and the driving shaft can protrude out of the two ends of the main body 722.

The fixing base 73 can be configured to mount the driving member 72. The fixing base 73 can include a supporting portion 732 and an assembly portion 734 connected to one end of the supporting portion 732. The assembly portion 734 can be positioned substantially perpendicular to the supporting portion 732. The supporting portion 732 can be substantially square shaped and define a through hole 735 corresponding to the driving shaft 724. The main body 722 can be fixed on the supporting portion 732, and the driving shaft 724 can run through the through hole 735. The assembly portion 734 can be fixed at the mounting base 10, thus the main body 722 can be fixed at the mounting base 10.

The driving shaft 724 can include a first end 7242 and a second end 7244, and the first end 7242 and the second end 7244 can protrude out of two ends of the main body 722. The first end 7242 can be configured to mount the resisting member 75, and the second end 7244 can run through the through hole 735 and movably connected to the cutter holder 30. When the driving shaft 724 moves away from the cutter 50, the cutter holder 30 can move with the driving shaft 724. The cutter holder 30 can include a protrusion 32, and the protrusion 32 can define an assembly hole 322 corresponding to the driving shaft 724. The brake 70 can further include a connecting member 74 sleeved on the driving shaft 724. The connecting member 74 can include a connecting portion 742 and a flange 744 formed at one end of the connecting portion 742. One end of the connecting portion 742 away from the flange 744 can be sleeved on the second end 7244 and movably run through the assembly hole 322. When the driving shaft moves a predetermined distance away from the cutting holder 50, the flange 744 can resist against the protrusion 32, thus the cutting holder 30 can move with the driving shaft 724 relative to the mounting base 10.

The resisting member 75 can be connected to the first end 7242 of the driving shaft 724. The resisting member 75 can include a fastening member 752 and a sleeve 754. In at least one embodiment, the fastening member 752 can be a nut sleeved on the first end 7242 of the driving shaft 724. The sleeve 754 can be substantially column shaped.

Figure 3:
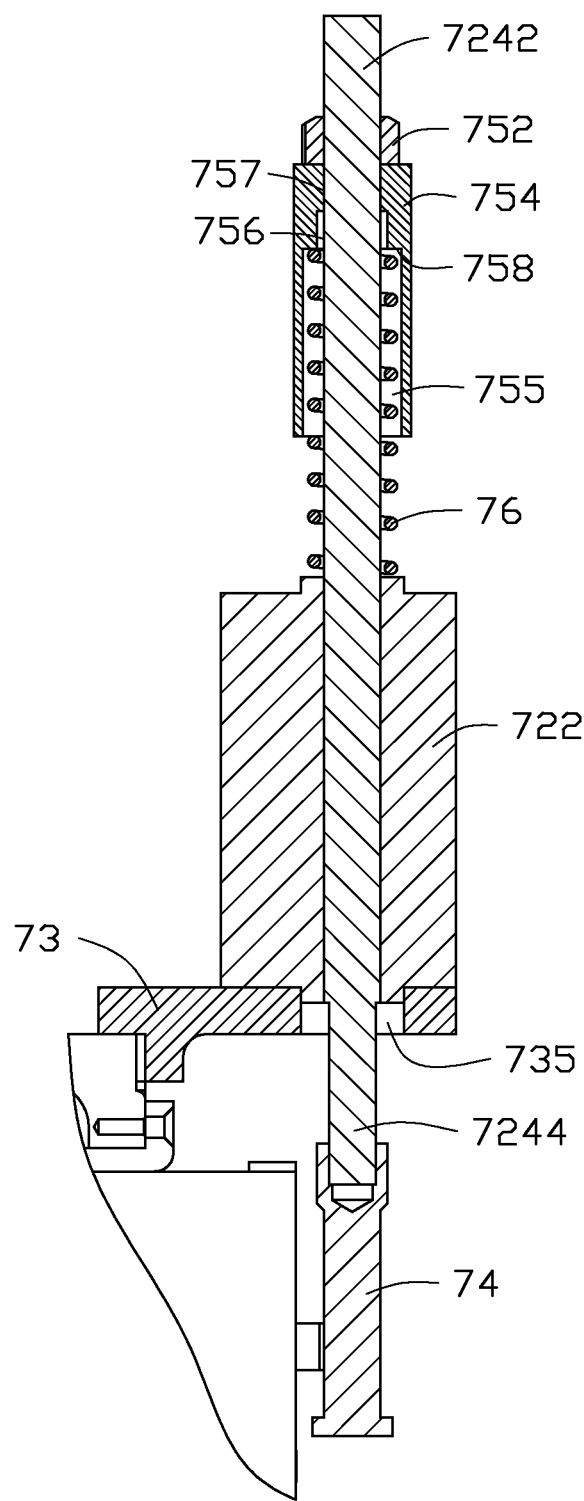
FIG. 3 is a cross sectional view taken along a line of the processing device shown in FIG. 1.

FIG. 3 illustrates that the sleeve 754 can be movably sleeved on the first end 7242 and positioned between the fastening member 752 and the main body 722. The sleeve 754 can define a first connecting hole 755, a second connecting hole 756, and a third connecting hole 757 in turn along the axial direction. The first connecting hole 755 can be defined away from the fastening member 752, and the third connecting hole 757 can be defined adjacent to the fastening member 752. The second connecting hole 756 can be defined between the first connecting hole 755 and the third connecting hole 757. A diameter of the first connecting hole 755 can be larger than the second connecting hole 756, thus a resisting portion 758 can be formed at the intersection of the first connecting hole 755 and the second connecting hole 756.

In at least one embodiment, the elastic member 76 can be a spring sleeve on the first end 7242 of the driving shaft 724. The elastic member 76 can be partially received in the first connecting hole 755, and two ends of the elastic member 76 can elastically resist against the resisting portion 758 of the sleeve 754 and a sidewall of the main body 722.

When assembled, the cutter holder 30 can be slidably mounted on the mounting base 10, and the cutter 50 can be fixed at the cutter holder 30. Then, the protrusion 32 can be mounted on the cutter holder 30, and the driving member 72 can be mounted on the mounting base 10. The connecting member 74 can be sleeved on the second end 7244 of the driving shaft 724 and run through the assembly hole 322 of the protrusion 32. After that, the elastic member 76, the sleeve 754, and the fastening member 752 can be sleeved on the first end 7242 in turn, and two ends of the elastic member 76 can resist against the resisting portion 758 of the sleeve 754 and the main body 722.

In operation of the processing device 100, the cutter 50 can process the workpiece, and the driving shaft 724 can extend toward the cutter 50, thus the elastic member 76 can be compressed. When the processing device 100 loses power, the driving member 72 would stop driving, the sleeve 754 can be pushed by the elastic member 76 under an elastic restoring force, and the driving shaft 724 can move toward one side of the driving member 72 adjacent to the elastic member 76. When the driving shaft 724 moves a predetermined distance, the flange 744 can resist against two sides of the assembly hole 322. The driving shaft 724 can create drag on the cutter holder 30, and the cutter holder 30 can move with the driving shaft 724 toward one end of the driving member 72 adjacent to the elastic member 76, such that the cutter holder 50 can move away from the workpiece. Therefore, the cutter 50 can be prevent from scraping the workpiece when the processing device 100 loses power. The fastening member 752 can be positioned at different location on the driving shaft 724, thus the stroke of the driving shaft 724 can be adjusted, and the cutter withdrawing distance can be adjusted.

The processing device 100 includes the brake 70. When the processing device lose power, the driving shaft 724 can move under the elastic restoring force of the elastic member 76, and the cutter holder 30 can move with the driving shaft 724 toward one end of the driving member 72 adjacent to the elastic member 76, thereby preventing a continual motion of the cutter 50 towards the workpiece.

In other embodiments, the sleeve 754 can be omitted, and the elastic member can elastically resist against the main body 722 and the fastening member 752.

In other embodiments, the elastic member 76 can be not sleeved on the driving shaft 724, as long as the two ends of the elastic member 76 can resist against the main body 722 and the resisting member 75. The elastic member 76 can be an elastic sleeve or other elastic structure.

The embodiments shown and described above are only examples. Many details are often found in the art such as the other features of a brake and a processing device using the same. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including, the full extent established by the broad general meaning of the terms used in the claims. It will therefore be appreciated that the embodiments described above may be modified within the scope of the claims.

What is claimed is:

1. A brake adapted for a processing device having a cutter holder to retract the cutter holder when the processing device losing power, the brake comprising:
   a driving member comprising:
      a main body and having two ends; and
      a driving shaft movably placed in the main body and having a first end and a second end, the first end and the second end respectively protruding out of the two ends of the main body, the driving shaft being driven by the main body to move in a straight line relative to the main body, and the first end being movably coupled to the cutter holder;
   a resisting member coupled to the second end of the driving shaft and comprising:
      a fastening member sleeved on one end of the driving shaft; and
      a sleeve movably sleeved on the driving shaft, the sleeve being positioned between the fastening member and main body; and
   an elastic member sleeved on the driving shaft and positioned between the main body and the fastening member;
   wherein the driving shaft is configured to move toward one side of the driving member adjacent to the elastic member under an elastic restoring force of the elastic member, whereby the driving shaft creates drag on the cutter holder, and the cutter holder moves with the driving shaft toward one end of the driving member adjacent to the elastic member; and
   wherein the sleeve comprises a resisting portion therein, the elastic member is partially received in the sleeve, and one end of the elastic member away from the main body resists against the resisting portion.

2. The brake of claim 1, wherein the sleeve defines a first connecting hole and a second connecting hole along the axial direction, a diameter of the first connecting hole is larger than a diameter of the second connecting hole, and the resisting portion is formed at the intersection of the first connecting hole and the second connecting hole.

3. The brake of claim 1, wherein the brake further comprises a connecting member, one end of the connecting member is sleeved on the first end of the driving shaft and the other end of the connecting member away from the driving shaft comprises a flange, and the flange is configured to resist against the cutter holder.

4. A processing device comprising:
   a mounting base;
   a cutter holder slidably mounted on the mounting base; and
   a brake configured for retracting the cutter holder when the processing device losing power and comprising:
      a driving member comprising
         a main body connected to the mounting base and having two ends; and a driving shaft movably placed in the main body and having a first end and a second end, the first end and the second end respectively protruding out of the two ends of the main body, the driving shaft being driven by the main body to move in a straight line relative to the main body, and the first end being movably coupled to the cutter holder;

a resisting member coupled to the second end of the driving shaft and comprising:
  a fastening member sleeved on one end of the driving shaft; and
  a sleeve movably sleeved on the driving shaft, the sleeve being positioned between the fastening member and main body; and an elastic member sleeved on the driving shaft and positioned between the main body and the fastening member;

wherein the driving shaft is configured to move toward one side of the driving member adjacent to the elastic member under an elastic restoring force of the elastic member, whereby the driving shaft creates drag on the cutter holder, and the cutter holder moves with the driving shaft toward one end of the driving member adjacent to the elastic member; and wherein the sleeve comprises a resisting portion therein, the elastic member is partially received in the sleeve, and one end of the elastic member away from the main body resists against the resisting portion.

5. The processing device of claim 4, wherein the sleeve defines a first connecting hole and a second connecting hole along the axial direction, a diameter of the first connecting hole is larger than a diameter of the second connecting hole, and the resisting portion is formed at the intersection of the first connecting hole and the second connecting hole.

6. The processing device of claim 4,
wherein the cutter holder comprises a protrusion, the brake further comprises a connecting member, the connecting member is sleeved on the first end of the driving shaft and run through the protrusion; and
wherein the connecting member comprises a flange, and the flange is configured to resist against the protrusion, whereby the cutter holder moves with the driving shaft.

7. The processing device as claimed in claim 4,
wherein the brake further comprises a fixing base, and the fixing base comprises a supporting portion and an assembly portion connected to one end of the supporting portion; and
wherein the main body is fixed on the supporting portion, the driving shaft runs through the supporting portion, and the assembly portion is connected to the fixing base.

* * * * *

UNITED STATES PATENT AND TRADEMARK OFFICE
CERTIFICATE OF CORRECTION

PATENT NO. : 9,951,755 B2  
APPLICATION NO. : 14/920546  
DATED : April 24, 2018  
INVENTOR(S) : Yang et al.

Page 1 of 1

It is certified that error appears in the above-identified patent and that said Letters Patent is hereby corrected as shown below:

On the Title Page

Please replace item (73) regarding "Assignees" with the following:
(73) Assignees: FU DING ELECTRONICAL TECHNOLOGY (JIASHAN)
CO., LTD., Jiashan (CN);
HON HAI PRECISION INDUSTRY CO., LTD., New Taipei (TW)

Signed and Sealed this
Twenty-seventh Day of August, 2019

Andrei Iancu
*Director of the United States Patent and Trademark Office*